United States Patent
Andino et al.

(10) Patent No.: US 6,726,322 B2
(45) Date of Patent: Apr. 27, 2004

(54) FENESTRATED LENS FOR INCREASED TEAR FLOW AND METHOD OF MAKING THE SAME

(75) Inventors: Rafael Victor Andino, Lawrenceville, GA (US); Curtis Dean McKenney, Duluth, GA (US)

(73) Assignee: Novartis AG, Basel (CH)

( * ) Notice: Subject to any disclaimer, the term of this patent is extended or adjusted under 35 U.S.C. 154(b) by 5 days.

(21) Appl. No.: 09/963,731

(22) Filed: Sep. 26, 2001

(65) Prior Publication Data

US 2002/0075447 A1 Jun. 20, 2002

Related U.S. Application Data (60) Provisional application No. 60/236,252, filed on Sep. 28, 2000.

(51) Int. Cl.[7] .................................................. G02C 7/04
(52) U.S. Cl. .............................. 351/160 R; 351/160 H
(58) Field of Search ..................... 351/160 R, 160 H, 351/161, 162, 177

(56) References Cited

U.S. PATENT DOCUMENTS

| | | | |
|---|---|---|---|
| 4,621,912 A | 11/1986 | Meyer | 351/160 |
| 4,666,267 A | 5/1987 | Wichterle | 351/160 |
| 5,044,742 A | 9/1991 | Cohen | 351/161 |
| 5,166,710 A | * 11/1992 | Hofer et al. | 351/160 R |
| 5,598,233 A | * 1/1997 | Haralambopoulos et al. | 351/160 H |
| 5,989,757 A | 11/1999 | Satoi | 430/7 |
| 6,036,314 A | 3/2000 | Wolfson | 351/160 |

FOREIGN PATENT DOCUMENTS

| | | |
|---|---|---|
| FR | 946 877 A | 6/1949 |
| GB | 592 055 A | 9/1947 |
| WO | WO 90/08339 A | 7/1990 |

OTHER PUBLICATIONS

International Search Report PCT/EP01/11176 dated Feb. 21, 2002.

* cited by examiner

*Primary Examiner*—Jordan M. Schwartz
(74) *Attorney, Agent, or Firm*—Robert Gorman; R. Scott Meece (57) ABSTRACT

A fenestrated contact lens having increased tear flow is provided. The fenestrated contact lens includes a lens body adapted for placement adjacent a surface of an eye which has an inner surface and an outer surface. The lens body has a first plurality of fenestrations extending therethrough which are biased to direct a flow of lachrymal fluid from a first location between the surface of the wearer's eye and the inner surface of said contact lens to a second location adjacent the outer surface of the contact lens. The lens body also includes a second plurality of fenestrations extending therethrough, which are biased to direct a flow of lachrymal fluid from a third location adjacent the outer surface of the contact lens to a fourth location between the surface of the eye and the inner surface of said contact lens.

28 Claims, 7 Drawing Sheets

ALTERNATING RINGS
FIG.3A

RANDOM
FIG.3B

FENESTRATED LENS FOR INCREASED TEAR FLOW AND METHOD OF MAKING THE SAME

RELATED APPLICATION

This application claims priority of Provisional Application No. 60/236,252, filed Sep. 28, 2000.

FIELD OF INVENTION

This invention relates to contact lenses and in particular to ways of increasing the flow of oxygen and nutrient laden tears through contact lenses to the surface of a wearer's cornea.

DESCRIPTION OF THE PRIOR ART

Hard contact lenses have the advantages of longevity, biocompatability, strength, durability, wettability and the ability to compensate for some types of astigmatism. However, conventional hard contact lenses also act as a barrier to reduce the flow of oxygen and nutrients to the corneal surface, which may lead to oedema and other undesirable effects. Soft contact lenses have been developed which have a higher oxygen permeability than hard contact lenses and thereby reduce the incidence of oedema and similar effects. However, even oxygen permeable contact lenses reduce the flow of oxygen and nutrient laden tears to the cornea. This reduced flow of tears can result in the accumulation of metabolic products from corneal cells behind the lens, growth of bacteria behind the lens, and general wearer discomfort.

One method previously disclosed to partially alleviate these problems has been to "fenestrate" the contact lenses by creating holes passing completely through the lenses to allow bulk tear flow and the transfer of dissolved oxygen through the lenses and to the eye surface. Various techniques have been proposed for the fenestration of contact lenses. For example, one system (see e.g., U.S. Pat. No. 3,227,855) uses a spark to locally burn a small hole through the lens. Others (see e.g., U.S. Pat. Nos. 3,833,786 and 3,971,910) describe laser based systems in which a concentrated beam is used to burn through the lens to produce the holes. Still other systems use drills to mechanically bore holes through the lens (see e.g., U.S. Pat. No. 6,101,219)

Conventional fenestrated contact lenses have holes intended to provide bi-directional diffusion of oxygen and/or flow of tears. However, by their passive and non-directional nature, these contact lenses have a less than optimal tear flow which can potentially result in low tear and oxygen flow to certain areas of the cornea. Their fenestrations also have a tendency to clog resulting in impaired tear flow. There is clearly a need for a fenestrated contact lens having an improved tear flow to improve corneal health and reduce the risk of corneal damage due to oxygen or nutrient starvation of the corneal cells.

Accordingly, it is an object of the present invention to provide a fenestrated contact lens having an increased oxygen and tear flow to the corneal surface.

It is another object of the present invention to provide a fenestrated contact lens that will direct tear flow in a desired pattern to optimize tear flow to the cornea.

It is yet another object of the present invention to provide a method for producing fenestrated contact lenses having increased tear flow characteristics.

Other objects, aspects, and advantages of the present invention will be apparent to those skilled in the art from a reading of the following detailed disclosure of the invention.

BRIEF DESCRIPTION OF THE INVENTION

The above objectives are accomplished according to the present invention by providing a fenestrated contact lens having increased tear flow. The fenestrated contact lens includes a lens body adapted for placement adjacent a surface of an eye which has an inner surface and an outer surface. The lens body has a first plurality of fenestrations extending therethrough which are biased to direct a flow of tear fluid from a first location between the surface of the wearer's eye and the inner surface of said contact lens to a second location adjacent the outer surface of the contact lens. The lens body also includes a second plurality of fenestrations extending therethrough, which are biased to direct a flow of tear fluid from a third location adjacent the outer surface of the contact lens to a fourth location between the surface of the eye and the inner surface of said contact lens.

BRIEF DESCRIPTION OF THE FIGURES

The construction and design to carry out the invention will hereinafter be described together with other features thereof. The invention will be more readily understood from a reading of the following specification and by reference to the accompanying drawings forming a part thereof, wherein an example of the invention is shown and wherein.

DETAILED DESCRIPTION OF THE PREFERRED EMBODIMENT

Figure 1:
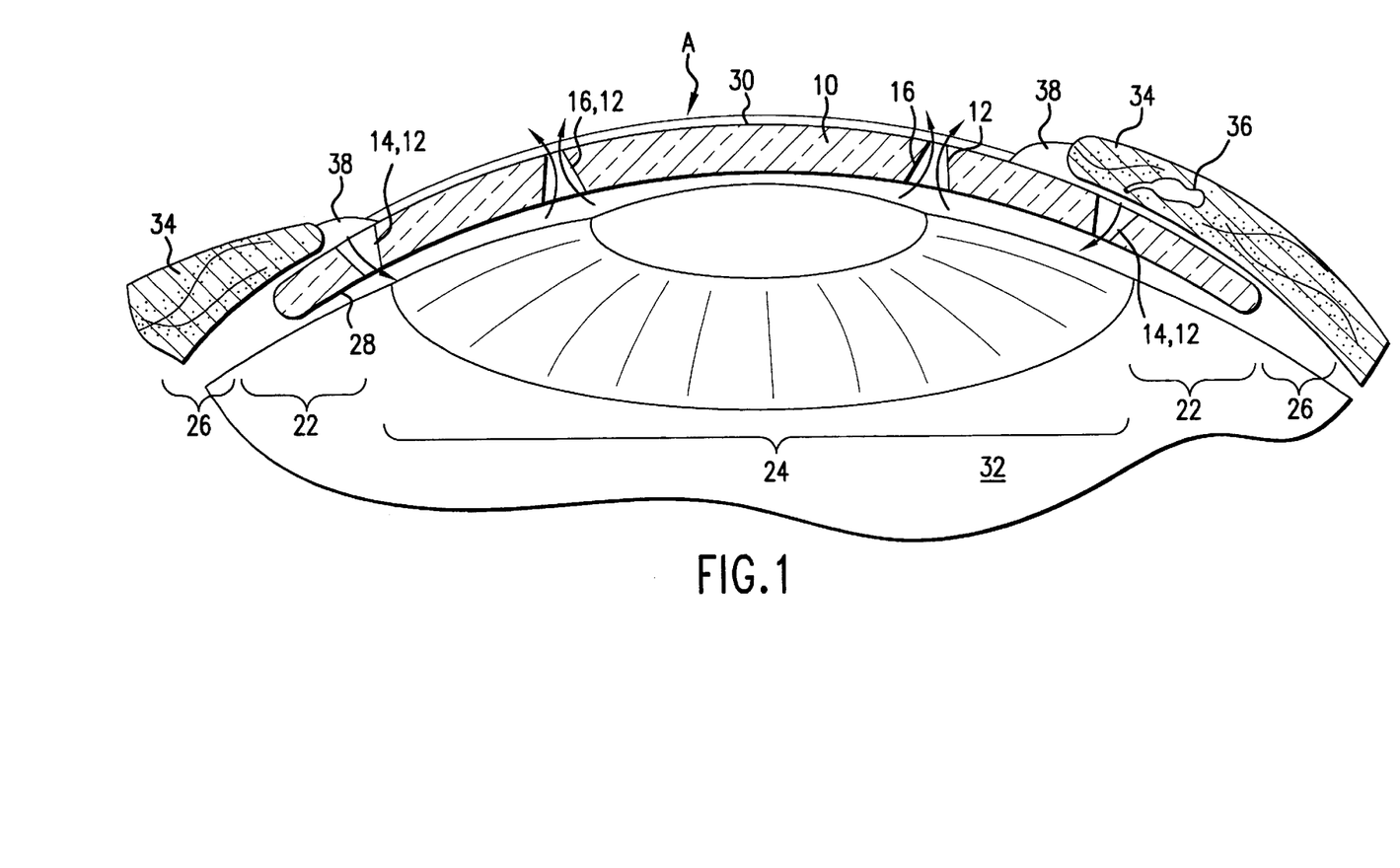
FIG. 1 is a cross-sectional diagram illustrating a preferred embodiment of the fenestrated lens of the present invention.

Referring now in more detail to the drawings, the invention will now be described in detail. As shown in FIG. 1, a preferred exemplary fenestrated contact lens A is provided for allowing increased tear flow to the corneal surface of the eye of a lens wearer in accordance with the present invention. Fenestrated contact lens A includes a lens body 10 having a plurality of fenestrations 12 extending therethrough at strategic locations. An inwardly biased subset 14 of fenestrations 12 are disposed to be located over the tear producing region 22 of the eye when worn by a wearer and are biased to provide tear flow inward toward the eye surface. A outwardly biased subset 16 of fenestrations 12 are disposed to be located adjacent the more central non-tear producing regions 24 of the eye and are biased to provide tear flow outward away from the eye surface. The combination of these inward and outward flow biased fenestrations allows a net tear flow to be established as illustrated in FIG. 1.

For illustrative purposes, lens body 10 may be differentiated into a central region 24, a tear region 22 and a peripheral region 26. Lens body 10 also has an inner surface 28 which, when worn is disposed adjacent the corneal surface of the wearer's eye 32, and an outer surface 30, which when worn is disposed adjacent the wearer's eyelid 34 and tear ducts 36. The overall dimensions of lens body 10 are within the normal ranges for hard or soft contact lenses. The outside diameter of lens body 10 is typically between about 5 to 20 millimeters with other diameters being possible in special cases, and more typically approximately 10 millimeters. Lens body 10 has a lateral or cross-sectional thickness generally between about 0.05 millimeters to 1.0 millimeters and more preferably in the range of 0.05 to 0.5 millimeters.

Lens body 10 can be made according to any of the known machining or molding processes which allow aspheric or spherical curvature contact lenses to be formed. The materials used in making the lens body 10 can be any of the conventional polymers used in oxygen permeable hard, semi-hard and soft hydrogel corneal contact lenses.

In accordance with the preferred exemplary embodiment, the tear region 22 is the preferred location of the inwardly directed subset 14 of fenestrations 12. As many as 1000 fenestrations may be used with the sizes varying from 0.1 $\mu$m to 200 $\mu$m. In the preferred embodiment, the fenestrations have a size in the range of 40 $\mu$m to 100 $\mu$m and are of sufficient size to allow the passage of tear fluid. The spacing of the fenestrations may be symmetric, such as the series of symmetric circles illustrated in FIG. 2 or at random throughout the tear region 22 as illustrated in FIG. 3. One of ordinary skill in the art will recognize that other arrangements of subsets 14 and 16 of fenestrations 12 may also be effective in directing tear flow. The fenestrations are preferably circular holes. However, they may be elliptical, slotted, or any other shape desired provided that they provide fluid communication between the inner and outer surfaces lens body 10.

Figure 2:
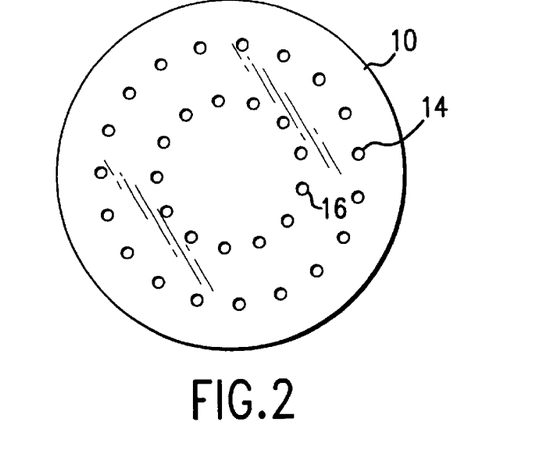
FIG. 2 is a front view of a fenestrated lens in accordance with the embodiment of FIG. 1.
Figure 3A:
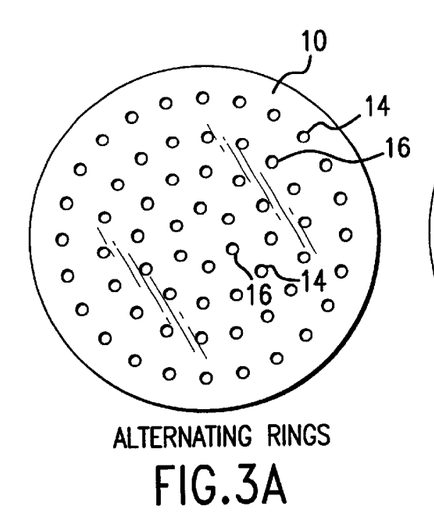
FIGS. 3A and 3B are front views of fenestrated lenses having fenestration patterns in accordance with alternative embodiments of the present invention.
Figure 3B:
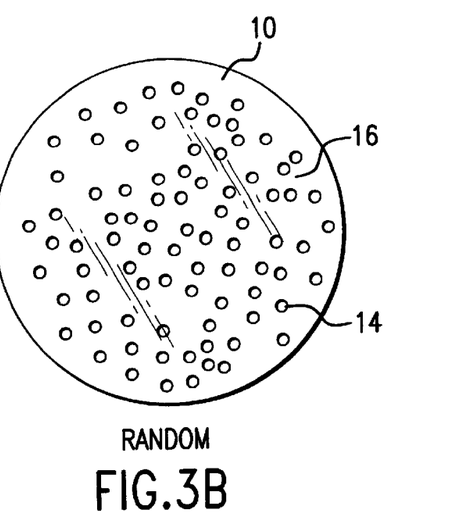

In the exemplary embodiment of FIG. 2, inwardly directed subset 14 of fenestrations 12 are arranged in a single concentric pattern wherein the inwardly biased subset 14 of fenestrations 12 forms a first ring along the tear region 22 of lens body 10. As fresh tear fluid is released from the tear duct 36 it accumulates between the outer surface 30 of lens body 10 and the inner surface of the wearer's eyelid 34 in a tear reservoir region 38. Inwardly directed subset 14 of fenestrations 12 are positioned adjacent to this tear reservoir 38 to direct the flow of the fresh tears to the area between inner surface 28 of lens body 10 and the surface of the wearer's cornea 32. Outwardly biased subset 16 of fenestrations 12 includes at least a first ring positioned near the central portion of the eye away from tear producing region 22. Preferably both sets of fenestrations are positioned to be outside of the visual field of the wearer.

As illustrated in FIG. 1, the tear fluid entering the area between the inner surface 28 of lens body 10 and the surface of the wearer's cornea 30 flows outwardly away from first subset 16 of fenestrations 12 towards the peripheral edge 26 and central area 24 of lens body 10. The tear fluid then exits the area between the inner surface 28 of lens body 10 and the surface of the wearer's cornea 30 through outwardly biased subset 16 of fenestrations 12 in the central area of lens body 10. The resulting net flow, as shown in FIG. 1, should result in improved transport of tear fluid along the entire corneal surface between the sets of fenestrations, resulting in improved oxygen and nutrient flow to the corneal cells.

One of ordinary skill in the art will recognize that more complex patterns of directionally biased fenestrations could lead to similar enhanced flow of tear fluid. For example and not limitation, as shown in FIG. 3A, alternating concentric circles of inwardly and outwardly disposed fenestrations 12 might be arrayed across lens body 10 to provide increased tear flow of much shorter distances. Similarly, as shown in FIG. 3B a mixture of inwardly and outwardly biased fenestrations 12 might be deployed randomly across the entirety of lens body 10 to increase general tear fluid flow.

Figure 4:
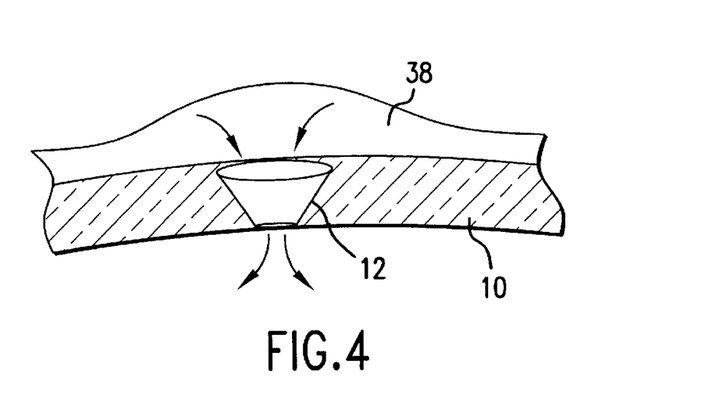
FIG. 4 is a cross-sectional view of a tapered fenestration providing directional flow in accordance with a preferred embodiment of the present invention.

As illustrated in FIG. 4, in a preferred embodiment a fenestration may be biased to provide directional tear flow by providing the fenestration with a tapering venturi-like cross section which is larger on the side from which flow is desired to originate and smaller on the side to which flow is to be directed. When a pressure differential is established, either through the pressure exerted on tear reservoir 38 when the wearer blinks, or merely though injection of tear fluid from the lachrymal ducts 36, fluid will preferentially flow through the fenestrations 12. Thus, blinking of the wearer's eye can function as a pumping action to actively drive the flow of tear fluid across the corneal surface.

Figure 5:
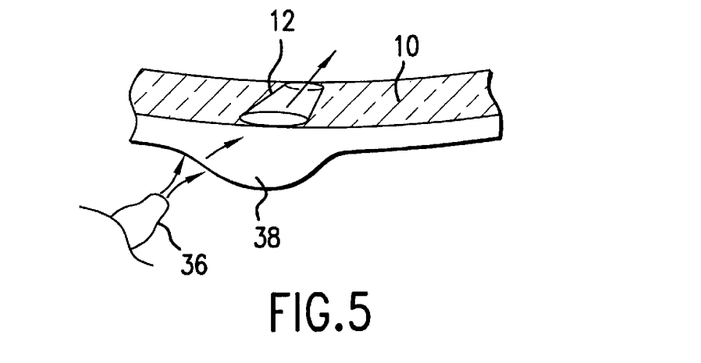
FIG. 5 is a cross-sectional view of an angled fenestration providing directional flow in accordance with an alternative embodiment of the present invention.

As shown in FIG. 5, another mechanism which may suffice to establish directional tear flow my be the inclusion of fenestrations 12 disposed at an angle through lens body 10. Tear fluid will naturally flow away from tear duct 36 or tear reservoir 38 when pressure is applied or tear fluid is secreted. By angling the fenestrations, a net flow can be established directing a portion of the tear fluid to the area between the inner surface of lens body 10 and the surface of the wearer's eye 30. A similar set of angled or regular fenestrations in the central region of lens body 10 would then allow the exit of tear fluid from the area between the lens and the eye.

Figure 6:
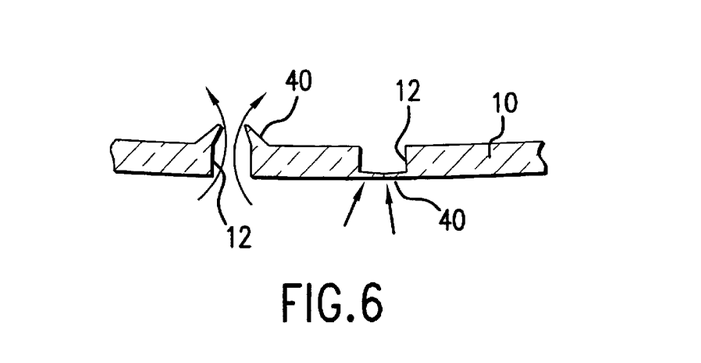
FIG. 6 is a cross-sectional view of an fenestration having check valve characteristics for providing directional flow in accordance with an yet another alternative embodiment of the present invention.

In yet another alternative environment, illustrated in FIG. 6, a fenestration may be biased to provide directional tear flow by the inclusion of flexible members 40 which effectively act as check valves to limit the flow of tear fluid to a desired direction. Tear flow from the tear source side of fenestration 12 flows through the fenestration 12 causing flexible members 40 to move apart. However, tear flow in the reverse direction drives flexible members 40 together to block flow through the fenestration 12.

In the preferred embodiment, the fenestrations 12 are coated with a thin layer of a hydrophilic coating by well known plasma or layer-by-layer techniques decrease the hydrophobicity of the inner surface of the fenestrations. Addition of the coating will help to minimize the accumulation of hydrophobic debris which would otherwise quickly clog the fenestrations. The hydrophilic coating may be deposited by any conventional means, such as plasma deposition, simultaneously with the coating which is typically applied to the entire lens surface. More preferably, the surface is applied by the polyelectrolyte layer-by-layer process as taught in copending commonly assigned application Ser. No. 09/199,609, incorporated herein by reference.

The fenestrations 12 of the present invention can be produced on finished lenses according to a variety of known methods including the use of a laser (single beam or diffused beam), CNC lathes, hand drills, manual lathes and precision drills. Alternatively, the fenestrations 12 may be actually molded into the lens surface during the lens polymerization process.

In a preferred exemplary embodiment, fenestrations 12 are created using an pulsed excimer laser to sculpt the surface of finished contact lenses. Excimer lasers are pulsed gas lasers which can operate at fixed wavelengths throughout the ultraviolet region. Lasing occurs as the result of a pulsed electrical discharge occurring in a high pressure gas. The commonly used three-component gas mixture is made up mostly of a buffer gas such as neon, a smaller amount of a rare gas such as argon, krypton or xenon, and a trace amount of a halogen donor such as hydrogen chloride or fluorine. The relative ratio of rare gas to halogen determines the output wavelength, with the three most powerful excimer lasers being argon fluoride (ArF) at 193 nm, krypton fluoride (KrF) at 248 nm, and xenon chloride (XeCl) at 308 nm. Excimer lasers operate only in a pulsed mode, with pulse durations typically of the order of ten nanoseconds, and output energies per pulse of a few hundred millijoules. This is a unique combination of ultraviolet output and high peak power, and can remove material through the process of ablation. Excimer lasers are especially well suited for the formation of fenestrations in contact lenses because they can remove material with very high precision and with virtually no heat-affected zone in the surrounding regions of the contact lens. The fenestrations 12 may be drilled through the lenses either while the lenses are still attached to one half of the mold or may be done on a specially adapted pedestal.

The width of the holes drilled by an laser will naturally vary through the thickness of the lens if the laser exposure is controlled to achieve less than complete burn-through. By varying the laser exposure, the exit diameter of these holes may easily be varied from 20 microns in thin sections (less than 150 microns) to 1–2 microns in thick sections (greater than 150 microns). Use of mask allows creation of complex hole patterns in one application of desired number of laser pulses and avoids the need for intricate movement of the beam.

In an alternative embodiment, the fenestrations of the present invention may be created using an atomic force microscope (AFM) to precisely contour the surface of a lens mold while simultaneously allowing detailed inspection of the lens mold surface. In its traditional sense the AFM operates by "feeling" a surface with a flexible probe in a manner reminiscent of the tracking of a phonograph needle along the contours of the groove of a record. However, in an AFM the probe is much smaller (on the order of 50 nm). The force interaction between the AFM probe and the sample is smaller than the forces that hold atoms together, the displacement of the probe can be measured to a fraction of the dimensions of the atom, and the tip can terminate a single atom. This unique combination of features allows inspection down to the atomic scale of surfaces, in a non-perturbing manner.

The technology of AFM can be applied to the inspection of both metal and plastic lens molds to obtain information about shape and surface roughness that would otherwise be unobtainable. This new information will help provide process feedback in order to optimize conditions for fabrication.

Aside from the standard imaging applications of the AFM, its platform can be used for modification of structures. Typical advanced mold fabrication can be limited by the sharpness and aspect ratio of the cutting tool. The AFM tip is unique in that is a very sharp high aspect ratio structure. This tip can be used to in an imaging mode to identify a "tool-lined" shape on the mold, and then be pressed into the surface to actually modify the feature at a high resolution.

The delicacy of the probe will prevent large scale modification of a surface. However, if the parameters of cutting are scaled appropriately, tip damage and wear can be managed. At the expense of tip radius of curvature, the robustness of the probe can be improved through diamond or diamond like coatings.

It is important to note that this tool is more than a scaled lathe tool. This tool will provide information about the shape of the surface, very accurately, without modifying the surface. Once a feature is identified, it can then be modified by the tip. This type of modification may also be useful when trying to improve sidewall slope and corner fidelity on regular lathed patterns.

Another method for producing the fenestrations of the present invention could include the use of a high resonance micromill to contour the mold surface in a manner analogous to a lathe. When making a lens, a standard lathe limits design options because of symmetry constraints. The ideal lens tool fabrication machine would be a hybrid between the mill and the lathe. The mill platform provides independent access to the surface of the lens mold, while the lathe provides the precision of a ultra-fine cutting tool. Fundamentally, the cutting action of the lathe can be reproduced on a mill platform.

Figure 7:
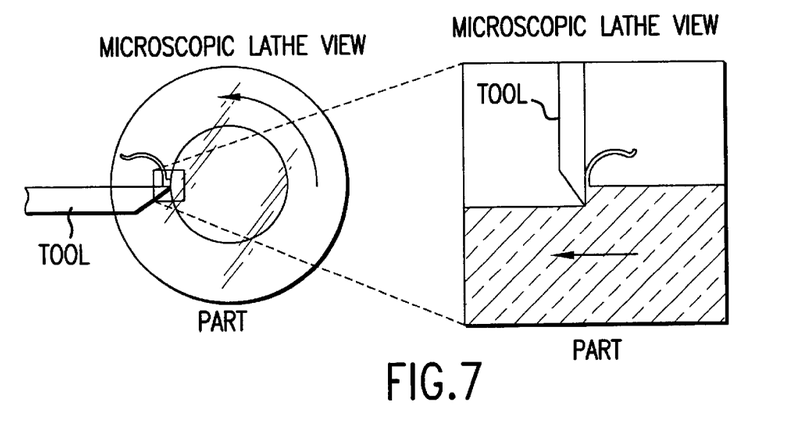
FIG. 7 is a block diagram illustrating the function of a standard lathe in accordance with the prior art.

The CNC lathe is a mainstay for fabricating current lens tooling. On any lathe, the local interaction between the lathe tool and the machined part is linear and, in principal, that linear interaction can be used to provide any arbitrary shape (see FIG. 7). In practice, this linear interaction cannot be exploited because of the lathe's mechanical design since turning the part and fixing the tool limits the freedom of the lathe and thus restricts fabrication to cylindrical symmetry.

It is, however, possible to create a new milling tool by reorienting the lathe structure. This new configuration will reproduce the lathe's tool/part interaction, but in a geometry that will allow fabrication of non-cylindrical symmetric parts.

Figure 8:
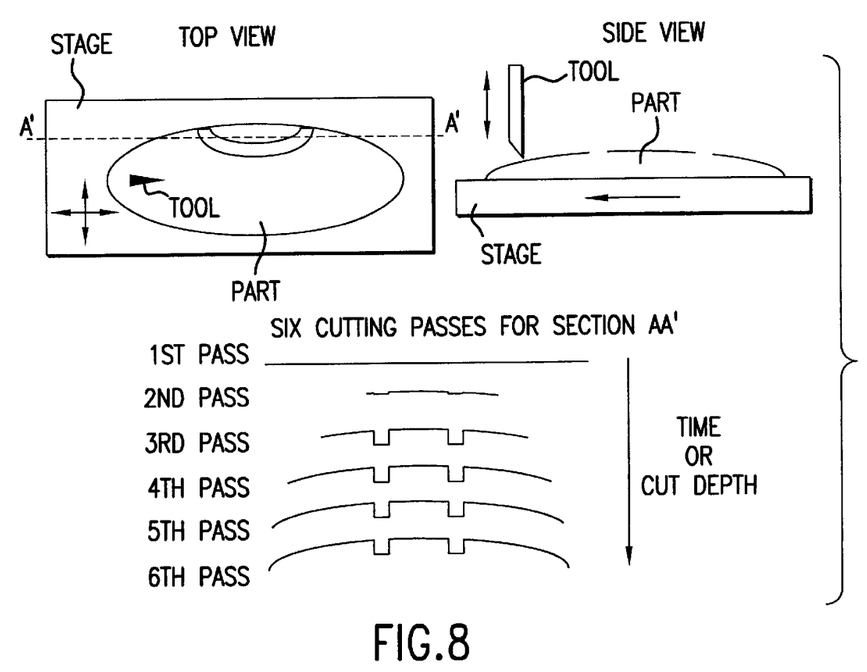
FIG. 8 is a block diagram illustrating the function of a mill lathe in accordance with an exemplary embodiment of the present invention.

FIG. 8 schematically illustrates this modified machine configuration. The cutting tool is that of a lathe, and the part is mounted on a mill machine's platform. The lathe tool's stage. We know from the previous figure that the local interaction of the lathe tool in a standard configuration is linear, and therefore the tool's interaction with the part in the new configuration is identical.

The operation of the hybrid machine would be to raster horizontally over the entire part surface while moving the cutting tool vertically to modulate the surface topography. Line traces that the cutting tool would follow for a given section are also shown. From the traces it can be seen that the entire cut would not be made in a single pass, but would increase in depth for each pass of the tool—just like the operation of a lathe. Note that although line traces are shown as a sequence, it is really rastered surfaces that would be cut in sequence.

Preliminary calculations show that the tool/part interaction experienced on a lathe can be replicated under the new configuration. Therefore, since the tool does not know whether the part is being spun or translated beneath it, the modification quality should be identical.

When cutting a 1 cm diameter piece of steel on a lathe, the recommended rotation rate is 400 RPM. This corresponds to a linear velocity of the tool on the part of 20 cm/s at the edge to 0 cm/s in the center.

Manufacturers of linear position systems produce a variety of stages. A brief examination of their catalogs show a number of stages that meet this velocity specification. For example the Newport PM500-8L has a 8 in travel at 10 cm/s with 25 nm position resolution. The specification for the slow scan is much less severe and can be met with a wide range of commercially available stages.

Rough calculations can be made for the Z actuator requirements. Maximum performance can be obtained by using a compound system. A long range slow actuator would track the slow varying background shape of the lens, and a short range high speed actuator would track the sharp features. In both cases the cutting sweep would be roughly 1 cm and the cut velocity is 10 cm/s. For the slow actuator, assuming the maximum displacement is 5 mm and the spatial frequency is 0.5 of a sinusoidal period, the bandwidth, or resonant frequency, of this actuator would have to be 5 Hz, and the response of the z movement would be 5 cm/s. For the fast actuator, for 10 periods per sweep and a displacement of 10 $\mu$m, the actuator requirements would be 100 Hz and 0.2 cm/s.

This new design can be thought of as a hybrid between the mill and the lathe, where only advantageous aspects of both machines are drawn upon. The mill can readily produce an arbitrary pattern in three dimensions because it has the freedom to independently address any X, Y and Z point on the surface of the part. The mill cannot be directly applied to the application of lens tool fabrication because the pixel resolution is limited by the spinning bit. The lathe, on the other hand, is not pixel limited because of the sharp cutting tool. However, in conventional implementations, the lathe does not have the capability to address an independent X, Y, and Z point on the surface. This hybrid machine could, therefore, prove to be the preferred tool for rapid lens prototype, development, and manufacture.

Yet another means for producing the fenestrations of the present invention is the use of focused ion beams (FIB's) to sculpt the lens mold surface. Focused ion beam systems have been employed to make precision modifications to a variety of surfaces. These modifications can be as simple as a single hole, or as complex as a three-dimensional cross-sectioning. The key ability of FIB technology is its capability to localize the modification to only the area requiring alteration.

Similar to a scanning electron microscope, the FIB system can function as a scanning ion microscope to produce greatly magnified, high-resolution images of very small objects, such as the submicron features of today's most sophisticated contact lenses. Unlike a scanning electron microscope, FIB systems can also remove material by using the ion beam to cut or mill. In this way an FIB system can quickly and accurately modify or prototype a mold for analysis. Or it can precisely cut or sharpen a line in a multi-radii lens structure. Finally, the FIB system can precisely deposit either insulating or conducting materials Onto a substrate. This means the FIB can actually add material to a mold in an arbitrary pattern. Known as FIB "microsurgery," this ability to cut and splice submicron features puts FIB technology at the leading edge of innovation.

The focused ion beam technique can be used as an aid in contact lens design and manufacture by performing rapid device alteration. The focused ion beam technique uses a beam of Gallium ions which is focused and scanned over the surface of the sample. The interaction of the ion beam with the sample results in ejection of atoms from the surface (sputtering) and the production of secondary electrons and ions. The secondary charged particles can be collected, and their signals amplified and displayed to form an image of the surface. Imaging resolution below 500 Angstroms is possible. This image will show both topographic information and materials contrast and can be used for navigating around the sample.

The production of ejected neutral atoms is generally referred to as sputtering. If the beam is rastered over one area for a length of time, material will be removed from that area. This process can be used to machine arbitrary shapes or sharpen edges on current mold designs, depending on the desired modification of the structure. Typical resolution for cutting is around 0.1 $\mu$m. The holes and cuts can be very accurately placed (within about 0.1 $\mu$m) and can reach buried layers providing the depth:width aspect ratio is kept below 3:1. Gas assisted etching can increase the aspect ratio to 6:1 or better.

If an organometallic gas such as $W(CO)_6$ is introduced in the area of the ion beam, the scanning parameters can be adjusted to decompose the molecules which adsorb onto the surface and form a metal layer. Repeated rastering of the beam leads to the formation of a metal layer which can be used to build up areas to produce novel lens design. Unfortunately, the deposited metal film is rather impure.

The FIB can be used to deposit a high quality oxide by applying a process similar to the one used for thin film deposition. A siloxane type gas and oxygen are introduced into the path of the ion beam at the worksite area. Decomposition of the complex silicon bearing molecule in the presence of oxygen leads to absorption into the surface and formation of a silicon dioxide insulator layer.

A limitation of current molding technology is the inability of plastic parts to hold their shape to very small tolerances such as would be required for the creation of very small fenestrations as contemplated in the present invention. The advantage of using plastic mold parts is that they are transparent to UV light which is necessary for curing hydrogel lenses. However, if the critical, or more complex side of a mold is made of metal, while the other side is plastic, the advantages of each material are retained.

Metal molds which are presently used to make plastic molds for forming hydrogel lenses are currently made to tolerances as precise as +/−0.01 micrometer, however, significant time and effort are required to machine the metal parts. A plastic mold, which is cast from the metal master, can have the same level of precision. However, it is not as stiff as metal and can easily be deformed out of tolerance in the lens molding and curing process.

There are two reasons that plastic lens molds are used:
1) Plastic is transparent to UV light which is used to cure hydrogel lenses.
2) Plastic is disposable so each lens is cast from a new mold that is not contaminated from a previous manufacturing step.

However, a plastic part need only be used for one side of the lens mold. The other side can be metal. The metal can be coated with a very thin coating appropriate to make the finished lens release when desired. A metal surface can be covered with a self-assembling monolayer of an appropriate substance for this purpose. The monolayer, only one molecule thick, is so thin that it does not change the mold dimensions enough to affect the final lens shape. To start out with, for test purposes, a teflon coating can be used.

One might expect that there could be a problem curing the gel near the metal because the electric field of light must be zero at the surface of a metal. However, that is only true for the frequency range within which the metal is a high reflector. Highly reflective substrates are known to increase standing wave effects. These effects can be reduced to manageable levels by using dyes or antireflective coatings below the resist layer. Another approach is to use UV light of several different wavelengths to average out the standing waves. Finally, an extra baking step between exposure and development can remove standing wave effects chemically.

A metal half-mold also has the advantage that it does not have to be cylindrically symmetric. Any shape that can be transferred to the metal surface will be replicated in the lens with high fidelity. Advanced machining or micromachining that can be done on metal but not on plastic can be used for odd shaped lens surfaces.

An additional problem encountered in the molding of contact lenses is the difficulty in creating thin edges. A thin edge presents problems because it is flimsy and prone to tearing when released form the mold. Also, it is difficult to machine a mold precise enough to allow hydrogel to enter the very small crevice near the lens edge while preventing flashing or leakage of the hydrogel from the mold edge.

One method useful for the creation of thin edges is to mold a lens having a larger diameter that the final product, and to then trim it to the desired size. The periphery of this lens is very thin but does not end until well beyond the design parameter. After release from the mold, the lens trimmed by a knife or, more preferably, a laser to the desired diameter.

Use of a laser allows the edge of the lens to be cut without touching it, thereby avoiding tearing of the lens edge. In one embodiment, a laser beam is focused into a tight spot and directed to trace out the desired cut. More preferably, a mask can be utilized to allow the entire cut to be precisely burned onto the lens in one set of laser pulses, eliminating the need for complex focusing and direction of the laser beam.

Another method useful to create a thin edge is to mask the edge of the mold with a variable density coating which lets less UV light illuminate the lens edge during the curing process. This will result in less crosslinking of the gel at the lens edge and a thinner lens in these areas. Yet another method potentially useful for the creation of a thin edge is to take advantage of standing wave effects. Standing waves are formed when the UV curing light strikes the metal mold surface, decreasing the intensity to zero at the mold surface. This effect could be used to reduce the curing of the hydrogel in very thin sections near the metal surface.

Figure 9:
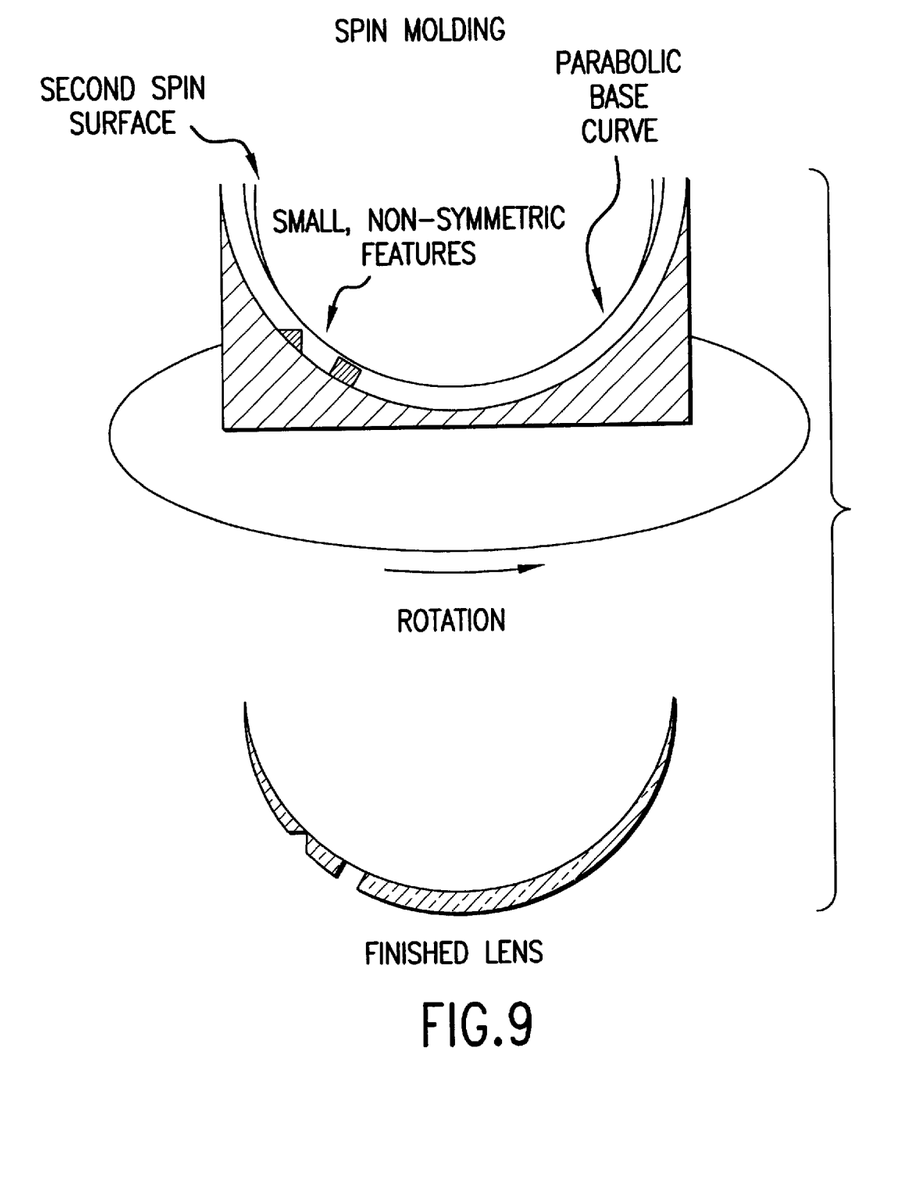
FIG. 9 is a diagram illustrating the process by which a multi-step parabolic surface may be created in accordance with another exemplary embodiment of the present invention.

Some advanced lens designs require lenses to be fabricated in geometries which are not spherically symmetrical. One mechanism for creating these lenses of these geometries is spin molding. When a circular dish of liquid is spun about its axis, the surface of the liquid assumes a parabolic, curved shape. For example, spinning mercury mirrors are used in some astronomical telescopes. The focal length, L, of a spinning liquid mirror is a function of its rotation rate:

$$L=g/2\omega^2$$

where g is the acceleration due to gravity and ω is the angular velocity in radians per second. The parabolic upper surface of the liquid does not depend on the shape of the support. This means that a liquid hydrogel can be made to assume a lens shape with a front curve specified by a spinning mold and a parabolic base curve set by a rotation rate. The shape may then be locked in by UV polymerization. Multiple base curves can also be made by curing the lens once and then adding more hydrogel and spinning again at a different rotational rate. The material added at the second step creates a section with a different radius of curvature (see FIG. 9).

Figure 10:
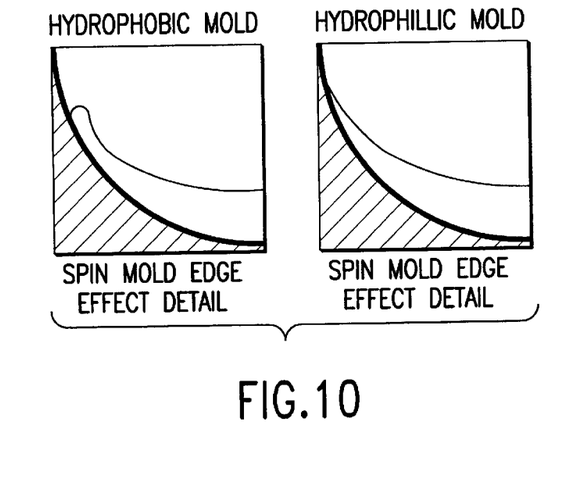
FIG. 10 is a cross-sectional view illustrating rounded and sharp lens edges in accordance with exemplary embodiments of the present invention.

Spin molding might also be utilized to produce very sharp lens edges or rounded edges. The edge profile is controllable by varying the hydrophobicity or hydrophilicity of the mold (see FIG. 10). On a hydrophobic surface, the hydrogel will form a meniscus due to surface tension and therefore a rounded edge shape. On a hydrophilic surface, the lens edge will be sharp due to spreading of the hydrogel along the mold surface.

Figure 11:
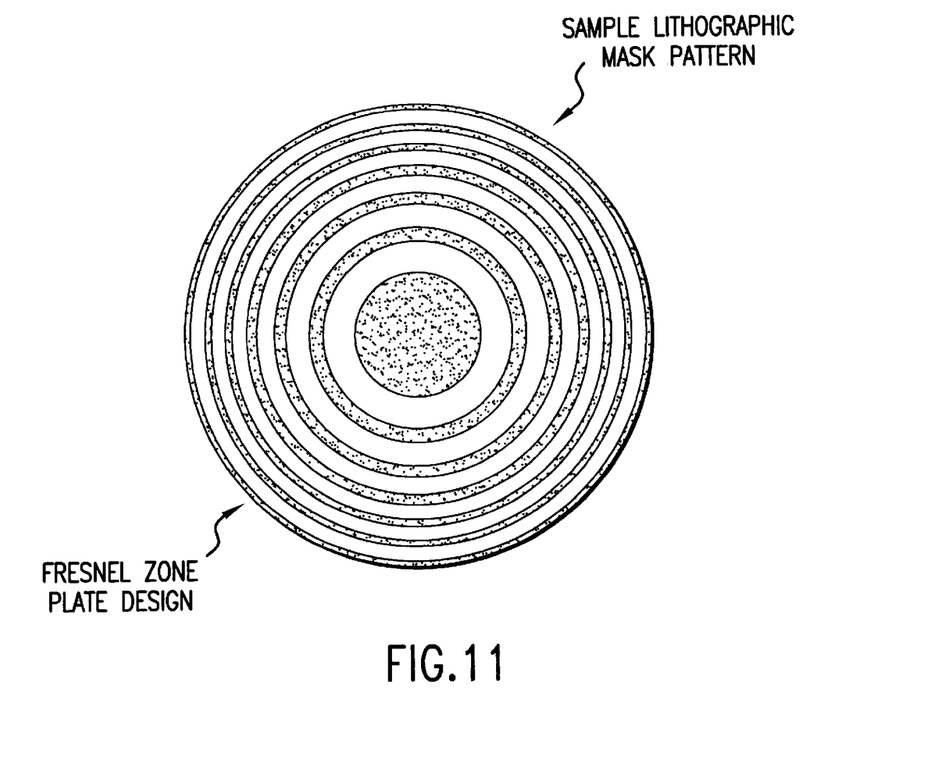
FIG. 11 is a frontal view of a lens having a square-wave indentation pattern in accordance with an exemplary embodiment of the present invention.

It is also contemplated that it may be desirable to make a lens surface that is basically spherical but is modulated by a square wave. In such a lens, the front surface optical zone is basically spherical, but includes square wave indentations that are approximately 0.1 to 1.0 mm wide and 5 to 10 microns in depth. Looking from the front of the lens, these indentations form annular rigs similar to a fresnel zone plate (see FIG. 11).

Figure 12:
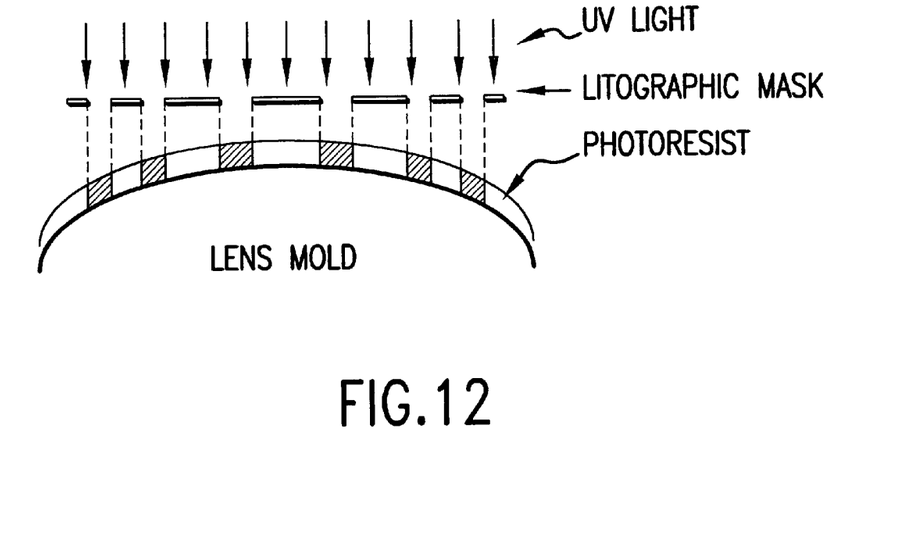
FIG. 12 is a diagram illustrating a photo-etching process for producing surface features on a lens in accordance with an exemplary embodiment of the present invention.

Since the deviations from the spherical surface are much wider than they are deep, it is possible to start with a standard spherical lens mold and use photolithographic techniques to etch in the desired pattern (see FIG. 12). The pattern is printed onto the mold surface with a photographic emulsion or photoresist which serves as a mask, allowing plasma etching of the mold to the proper depth. The pattern could be etched with vertical sidewalls using a plasma etch process that is anisotropic; i.e. vertical etch rate much higher than sideways etch rate.

The basic steps of this method are to: 1) create a spherical mold using standard techniques; 2) make a photolithographic mask with the annular ring pattern; 3) coat the mold surface with photoresist; 4) project the image of the mask onto the mold using UV light; 5) develop the image; and 6) dry etch the substrate to transfer the pattern to the mold surface.

Dry etching is a widely used technique in semiconductor processing and should be useful to create the annular ring pattern. However, one of ordinary skill in the art will recognize that this general method might also be adapted to transfer a wide variety of indentation patterns to the mold surface.

It, thus, will be appreciated that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A fenestrated contact lens comprising:
   a lens body adapted for placement adjacent a surface of an eye, said lens body having an inner surface and an outer surface;
   said lens body having a first plurality of fenestrations extending therethrough, wherein each of said first plurality of fenestrations is tapered to have a cross-section which is larger at the inner surface of the lens body and smaller at the outer surface of the lens body, so as to direct a flow of lachrymal fluid outward from a first location between the surface of said eye and the inner surface of said contact lens to a second location adjacent the outer surface of the contact lens; and
   said lens body also having a second plurality of fenestrations extending therethrough, wherein each of said second plurality of fenestrations is tapered to have a cross-section which is larger at the outer surface of the lens body and smaller at the inner surface of the lens body, so as to direct a flow of lachrymal fluid inward from a third location adjacent the outer surface of the contact lens to a fourth location between the surface of the eye and the inner surface of said contact lens.

2. The fenestrated contact lens of claim 1, wherein said fenestrations are coated with a hydrophilic coating.

3. The fenestrated contact lens of claim 1, wherein said fenestrations are positioned at a non-perpendicular angle with the surfaces of the contact lens body.

4. The fenestrated contact lens of claim 1, wherein, when said fenestrated contact lens is mounted adjacent a surface of a wearer's eye, said first plurality of fenestrations are positioned over the limbal area of said eye.

5. The fenestrated contact lens of claim 1, wherein, when said fenestrated contact lens is mounted adjacent a surface of a wearer's eye, said second plurality of fenestrations are positioned over the central area of said eye.

6. The fenestrated contact lens of claim 1, wherein, when said fenestrated contact lens is mounted adjacent a surface of a wearer's eye, said first plurality of fenestrations are positioned over the limbal area of said eye and said second plurality of fenestrations are positioned over a pericentral area of said eye outside of the central area of the eye.

7. The fenestrated contact lens of claim 1, wherein said first and second plurality of fenestrations are arranged in concentric rings.

8. The fenestrated contact lens of claim 1, wherein said fenestrations have been created via a means selected from the group consisting of laser milling and ion beam milling.

9. The fenestrated contact lens of claim 1, wherein said fenestrations have a size ranging from 0.1 microns to 200 microns.

10. A fenestrated contact lens comprising:

a lens body adapted for placement adjacent a surface of an eye, said lens body having an inner surface and an outer surface;

said lens body having a first plurality of fenestrations extending therethrough, wherein said first plurality of fenestrations are formed so as to direct a flow of lachrymal fluid outward from a first location between the surface of said eve and the inner surface of said contact lens to a second location adjacent the outer surface of the contact lens;

said lens body also having a second plurality of fenestrations extending therethrough, wherein said second plurality of fenestrations are formed so as to direct a flow of lachrymal fluid inward from a third location adjacent the outer surface of the contact lens to a fourth location between the surface of the eye and the inner surface of said contact lens; and wherein said fenestrations are coated with a polyelectrolyte coating to increase their hydrophilicity and prevent blockage.

11. The fenestrated contact lens of claim 10, wherein said fenestrations have tapered cross sections.

12. The fenestrated contact lens of claim 10, wherein said fenestrations are positioned at a non-perpendicular angle with the surfaces of the contact lens body.

13. The fenestrated contact lens of claim 10, wherein, when said fenestrated contact lens is mounted adjacent a surface of a wearers eye, said first plurality of fenestrations are positioned over the limbal area of said eye.

14. The fenestrated contact lens of claim 10, wherein, when said fenestrated contact lens is mounted adjacent a surface of a wearer's eye, said second plurality of fenestrations are positioned over the central area of said eye.

15. The fenestrated contact lens of claim 10, wherein, when said fenestrated contact lens is mounted adjacent a surface of a wearer's eye, said first plurality of fenestrations are positioned over the limbal area of said eye and said second plurality of fenestrations are positioned over a pericentral area of said eye outside of the central area of the eye.

16. The fenestrated contact lens of claim 10, wherein said first and second plurality of fenestrations are arranged in concentric rings.

17. The fenestrated contact lens of claim 10, wherein said fenestrations have been created via a means selected from the group consisting of laser milling and ion beam milling.

18. The fenestrated contact lens of claim 10, wherein said fenestrations have a size ranging from 0.1 microns to 200 microns.

19. A fenestrated contact lens comprising:

a lens body adapted for placement adjacent a surface of an eye, said lens body having an inner surface and an outer surface;

said lens body having a first plurality of fenestrations extending therethrough, wherein each of said first plurality of fenestrations comprises at least one flexible member acting as a check valve to direct a flow of lachrymal fluid outward from a location between the surface of said eye and the inner surface of said contact lens to a location adjacent the outer surface of the contact lens; and said lens body also having a second plurality of fenestrations extending therethrough, wherein each of said second plurality of fenestrations comprises at least one flexible member acting as a check valve to direct a flow of lachrymal fluid inward from a location adjacent the outer surface of the contact lens to a location between the surface of the eye and the inner surface of said contact lens.

20. The fenestrated contact lens of claim 19, wherein said fenestrations have tapered cross sections.

21. The fenestrated contact lens of claim 19, wherein said fenestrations are positioned at a non-perpendicular angle with the surfaces of the contact lens body.

22. The fenestrated contact lens of claim 19, wherein, when said fenestrated contact lens is mounted adjacent a surface of a wearer's eye, said first plurality of fenestrations are positioned over the limbal area of said eye.

23. The fenestrated contact lens of claim 19, wherein, when said fenestrated contact lens is mounted adjacent a surface of a wearers eye, said second plurality of fenestrations are positioned over the central area of said eye.

24. The fenestrated contact lens of claim 19, wherein, when said fenestrated contact lens is mounted adjacent a surface of a wearer's eye, said first plurality of fenestrations are positioned over the limbal area of said eye and said second plurality of fenestrations are positioned over a pericentral area of said eye outside of the central area of the eye.

25. The fenestrated contact lens of claim 19, wherein said first and second plurality of fenestrations are arranged in concentric rings.

26. The fenestrated contact lens of claim 19, wherein said fenestrations have been created via a means selected from the group consisting of laser milling and ion beam milling.

27. The fenestrated contact lens of claim 19, wherein said fenestrations have a size ranging from 0.1 microns to 200 microns.

28. The fenestrated contact lens of claim 19, wherein said fenestrations are coated with a hydrophilic coating.

* * * * *